United States Patent [19]
Greenwood et al.

[11] Patent Number: 5,345,588
[45] Date of Patent: Sep. 6, 1994

[54] THREAD PRIVATE MEMORY STORAGE OF MULTI-THREAD DIGITAL DATA PROCESSORS USING ACCESS DESCRIPTORS FOR UNIQUELY IDENTIFYING COPIES OF DATA CREATED ON AN AS-NEEDED BASIS

[75] Inventors: Stephen R. Greenwood, Merrimack, N.H.; R. Kim Peterson, Seattle; Benn L. Schreiber, Issaquah, both of Wash.

[73] Assignee: Digital Equipment Corporation, Maynard, Mass.

[21] Appl. No.: 947,881

[22] Filed: Sep. 17, 1992

Related U.S. Application Data

[63] Continuation of Ser. No. 404,788, Sep. 8, 1989, abandoned.

[51] Int. Cl.$^5$ .......................... G06F 12/06; G06F 9/30
[52] U.S. Cl. ...................................... 395/650; 395/700; 395/725; 364/948.11; 364/957.1; 364/966.1; 364/966.4; 364/967; 364/969; 364/970; 364/DIG. 2
[58] Field of Search .......................... 395/650, 700, 725

[56] References Cited

U.S. PATENT DOCUMENTS

| | | | |
|---|---|---|---|
| 4,719,562 | 1/1988 | Bailly et al. | 364/200 |
| 4,734,854 | 3/1988 | Afshar | 364/200 |
| 4,742,467 | 5/1988 | Messerich et al. | 364/200 |
| 4,785,395 | 11/1988 | Kelley | 364/200 |
| 4,827,406 | 5/1989 | Bischoff et al. | 364/200 |
| 5,127,103 | 6/1992 | Hill et al. | 395/575 |
| 5,159,678 | 10/1992 | Wengelski et al. | 395/425 |

OTHER PUBLICATIONS

Winner, Robert "Naming and Binding in a Vertical Migration Environment" IEEE Trans. Software Engineering vol. 14, No. 5, pp. 599–607 (May 1988).
Bershad et al. "Lightweight Remote Procedure Call" ACM Operating Systems Review vol. 23, No. 5, pp. 102–112 (1989).
Wakefield, Scott "A Local Variable Storage Mechanism" IEEE Computer Society Conference, Feb. 1983, San Francisco, pp. 286–289.
Peterson, "A Yellow-Pages Service for a Local Area Network" Proceedings of the ACM SIGCOMM '87 Workshop ACM Press, 1988 pp. 235–242.

*Primary Examiner*—Thomas C. Lee
*Assistant Examiner*—Peter Y. Wang
*Attorney, Agent, or Firm*—Christensen, O'Connor, Johnson & Kindness

[57] ABSTRACT

A method and arrangement for providing each thread of execution (28, 30, 32 and 34) of a multi-threading digital data processing environment with private copies of each set of initialization data (regions 60-1 through 60-4 and 62-1 through 62-4) that is required by procedures (44, 46) which are executed in the context of more than one of the threads. The regions (duplicate data copies) are generated from templates (56, 58) that include a base or original copy of the required set of initialization data. The templates are formulated during operation of the digital data processing system to compile, link and load the procedures and are each identified by a region descriptor (72) which includes a region index (a non-negative integer) and the memory address of the template. Regions are created when the initialization data of the region is required by a procedure that is executing within the context of a thread (i.e., regions are created on an as needed basis) and the memory address of each region is stored in a thread address array (70) so that subsequent access by procedures executing in the context of the same thread can be made using the region descriptor. To conserve system memory, the thread address array is not established in memory until the corresponding thread is being executed and a procedure of the thread requires initialization data (i.e., a region for that thread is to be created).

42 Claims, 5 Drawing Sheets

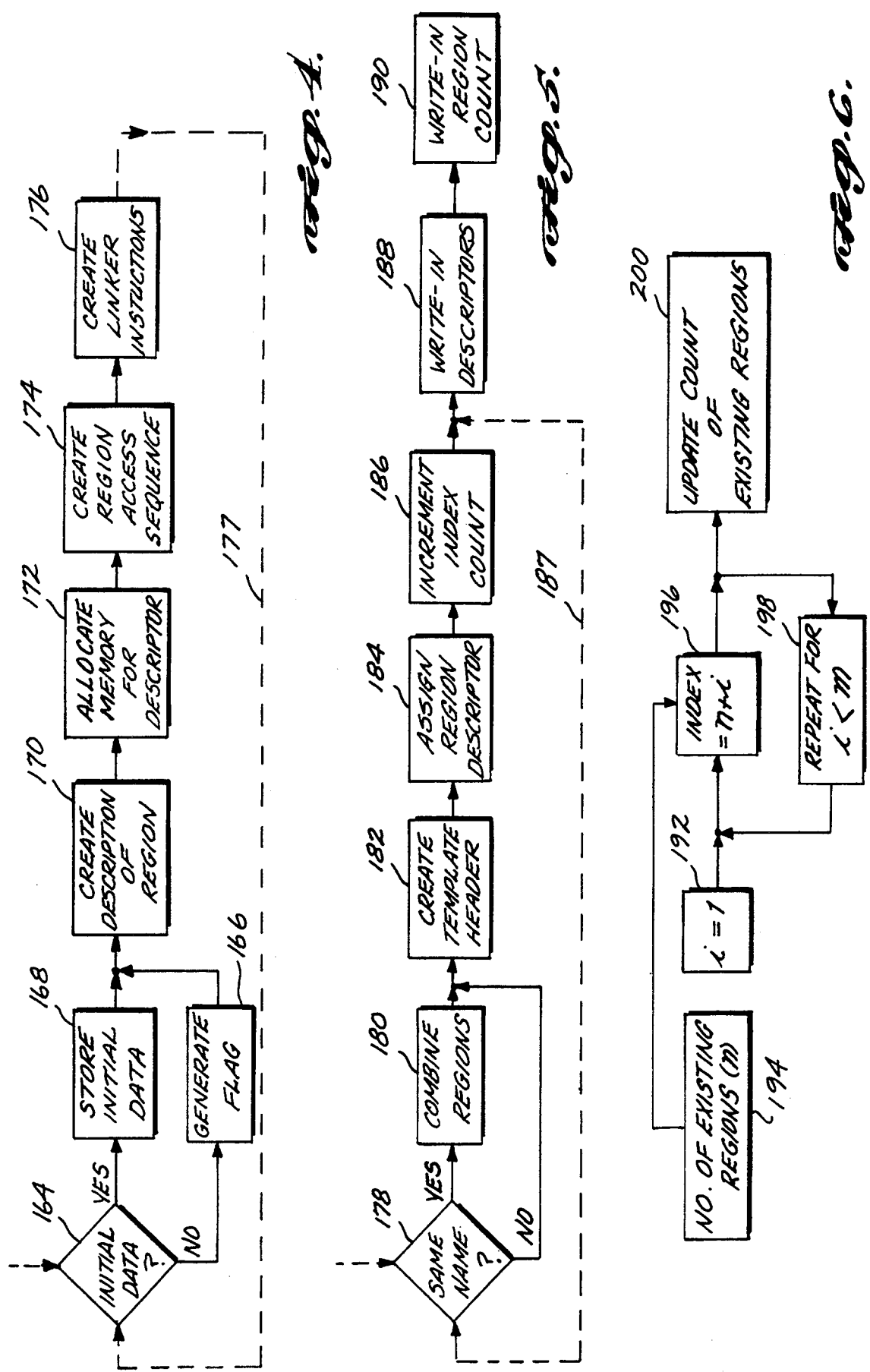

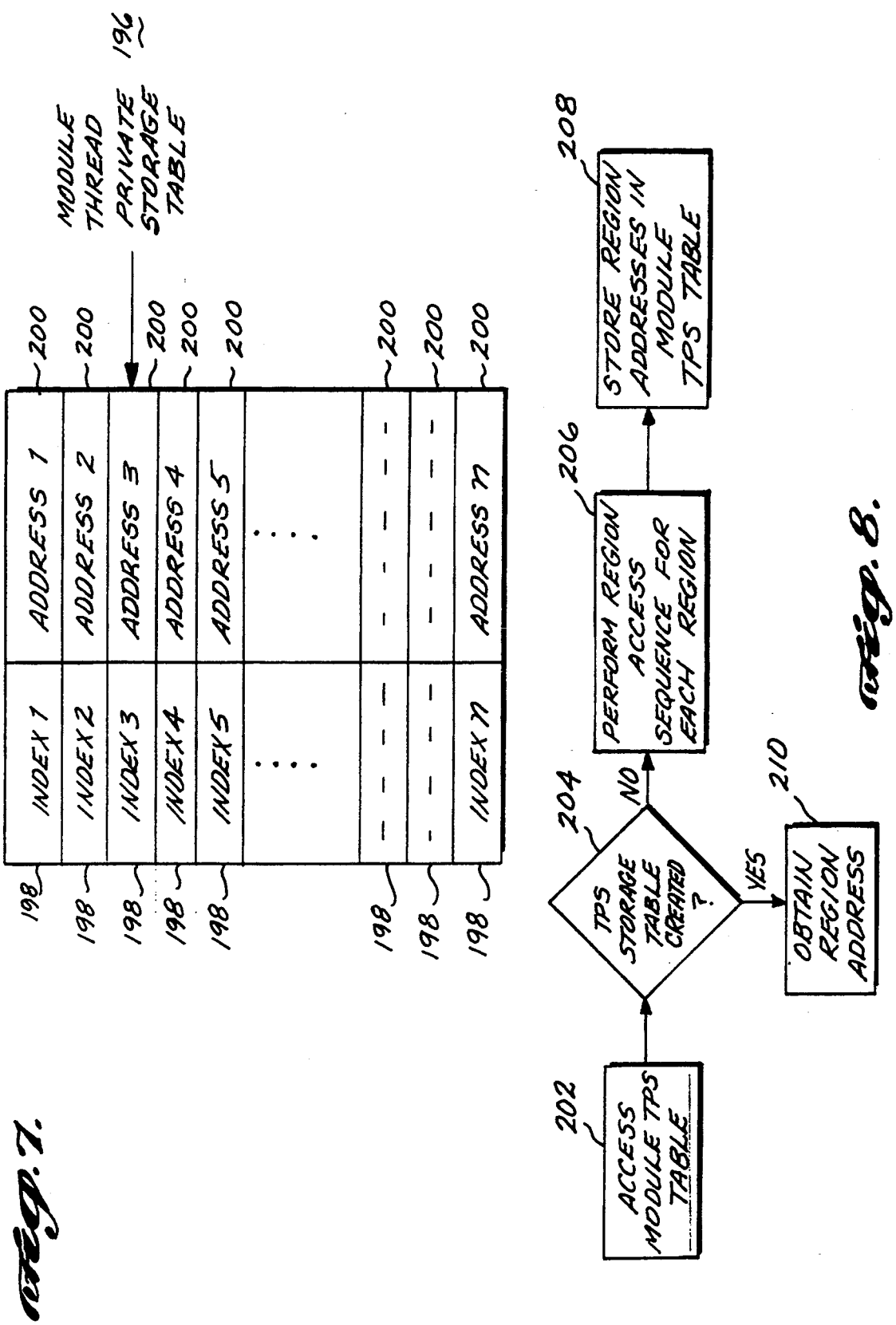

THREAD PRIVATE MEMORY STORAGE OF MULTI-THREAD DIGITAL DATA PROCESSORS USING ACCESS DESCRIPTORS FOR UNIQUELY IDENTIFYING COPIES OF DATA CREATED ON AN AS-NEEDED BASIS

This application is a continuation application based on prior copending application Ser. No. 07/404,788, filed on Sep. 8, 1989, now abandoned.

FIELD OF THE INVENTION

This invention relates generally to the field of digital data processing systems and, more specifically, to memory management in digital data processing systems that include hardware and software support for creating and controlling multiple threads of execution.

BACKGROUND OF THE INVENTION

In recent years, a substantial amount of effort has been expended to improve the efficiency of digital data processing systems, both from the standpoint of the time required for executing a processing task and from the standpoint of reducing the amount of memory required during execution of any particular task. One concept that has been developed relative to improving execution time involves the use of multiple "threads of execution," with each thread of execution (or "thread") being a separate sequential flow of control that takes place during execution of the data processing program or application. Stated otherwise, a thread is the active execution of a designated data processing routine, including any nested routine invocations.

Digital data processing with multiple threads ("multi-threading") can provide increased processing efficiency both in data processing systems equipped with a single processing unit and in multiple processor systems which support parallel processing (concurrent processing by a plurality of processing units that are included in a single processing system or computer). For example, systems which provide hardware and software support for parallel processing of multiple threads (sometimes referred to as "kernel threads" or "light weight processes") can be employed to enable concurrent processing of a procedure by all of the processors, thereby dividing the task to be performed and decreasing the task execution time. In systems utilizing a single processor, one example of the use of multi-threading is employing one thread to monitor the user interface while one or more additional threads carry out computational and other data processing tasks. This use of multi-threading allows rapid system response to a user request even during periods of time in which a previous user request is being carried out by other threads. A second example of multi-threading in a single processor system is the use of one thread to implement input/output functions and other threads to implement other computational and data processing activities. In this case, multi-threading allows the processing system to overlap time-consuming input/output activities with computational and other data processing activities.

In many implementations of multi-threading, more than one thread executes the same data processing procedure and, in addition, each execution of the procedure that is common to the threads requires one or more sets of initialization data that is supplied either by the system user or is supplied as the result of another procedure that is executed during the course of the data processing operation. Moreover, in the same and other implementations of multi-threading, one or more of the threads may execute a number of procedures that require the same initial data.

Difficulties can arise if the data processing implementation stores a single copy of the required initialization data for shared use by threads that execute a common procedure or if one or more threads share a single copy of data for execution of a number of procedures that require the same initialization data. Specifically, if a common procedure that is executed by a number of threads modifies the initialization data during execution of the procedure, only the first thread will execute the common procedure with access to the correct data. Similarly, in implementations in which one or more of the threads executes a number of procedures that require the same initialization data and the data is modified during execution of the procedure, only the first executed procedure will have access to the correct data. Thus, in both single processor and multi-processor multi-threading data processing arrangements, sharing a single copy of initialization data can result in failure of the system to obtain the proper result.

There can be disadvantages and drawbacks of sharing initialization data between procedures of a single processor implementation of multi-threading even if only one of the procedures modifies or changes the initialization data. For example, although it is possible to schedule execution of the procedures so that the procedure that modifies the initialization data is performed only after execution of the other procedures that require that same data, such scheduling may result in far less than optimal operation since a substantial delay may be encountered while the system completes execution of all other procedures that require that data. Moreover, such a scheduling constraint may unduly increase the complexity of programming the system and may result in an undesirable amount of additional coded instructions that must be stored in system memory and executed.

There are two prior art approaches for providing identical initialization data to each procedure requiring that data. First, multiple copies of the data can be stored at known or predetermined addresses in the system memory with each copy in effect being assigned to a different thread. Multiple storage of this sort allows the procedures that are executed by a thread to access a different (or "thread private") copy of the initialization data. Second, a single copy of the data can be stored in memory and dynamically copied during execution of each procedure requiring that data. However, prior attempts to use these techniques have not resulted in a system which realizes to the full extent the decreased processing time and low memory overhead that can be attained in a multi-threading environment. For example, an extremely large amount of memory space can be required for separate stored copies of the initialization data in situations in which the procedures to be executed require numerous sets of initialization data.

Moreover, the prior art has not provided a system that satisfactorily, incorporates or facilitates certain other aspects or features of the current state of the data processing art. For example, in many data processing implementations, it is either desired or necessary that a process being executed be capable of incorporating one or more data processing routines that are stored in a separate library of the data processing memory. In such a case, the desired separate library procedures may be brought into system memory and linked with the user supplied routines before the procedures and data required for the data process are loaded into memory and executed. Alternatively, in some cases, one or more separate library procedures may be dynamically activated so that instructions and data for the separate library routine are not loaded into the memory space being used for the execution of other related data processing procedures until a procedure being executed references or calls the separate library routine.

Multi-threading data processing arrangements which store copies of the required initialization data at known memory addresses and allocate or assign a different copy of the initialization data to each thread of execution cannot be used in many situations that utilize procedures and data from a separate library. For example, oftentimes one or more of the procedures being executed in a multi-threading environment require initialization data that must be contributed by the separate library. If the procedure and data of the shared library are dynamically activated it is impossible to know the memory address for the initialization data when it is loaded into the memory space being used for processing.

Further, all or most of the prior art attempts to provide copies of data that are private to each thread of execution in a process have been implemented in accordance with a particular high level computer language such as FORTRAN 77. Because of the time and expense involved in developing a computer program in any particular programming language and in translating such a program into a different programming language, there is a growing need for data processing systems that create an executable program from program parts that are written in different languages. Attendant to that need is a need for improved multi-threading systems that are implemented in a generalized form that allows the multi-threading system to be incorporated in a data processing environment that is capable of creating an executable program from program parts that are written in different programming languages.

SUMMARY OF THE INVENTION

This invention provides a new and useful system for multi-thread data processing environments in which separate copies of data (herein referred to as "regions") are provided to each procedure that: (a) requires such data; and (b) is executed in the context of more than one of the multiple threads.

For example, in a multi-processor system that utilizes four threads of execution to control and operate four separate processors that execute a common procedure that includes coded instructions for processing a particular set of data, a set of four regions is established (one region per thread), with an identical copy of the data being included in each of the regions. In addition, in situations in which the common procedure includes additional instructions for processing another (different) set of data, an additional set of regions is provided so that a separate copy of the additional data is available when the common procedure is executed by each of the threads. Thus, each thread of execution has associated with it a collection or set of all regions necessary for every procedure that is executed in the context of that thread. Since each thread of execution includes regions that are private to that thread of execution (i.e., are not shared with other threads), changes to data that may occur during execution of a procedure in the context of one thread will have no effect on the same procedure when it is executed in the context of one of the other threads.

Although one of the basic provisions of the invention is the above-described thread private storage, practice of the invention does not require creation of a region (i.e., existence in memory of the duplicate data copy) until a procedure that is being executed in the context of a thread requires access to that particular region in order to continue execution of the procedure. Thus, in accordance with the invention, storage for the data included in the region need not be allocated and occupied prior to the time at which access to the region is required.

To allow creation of each region during execution of the procedure that requires the data, a base or original copy of the data for the region is stored in a "template" that is formed during the compilation and linking of the programs and data that are required to carry out the desired process. In addition, during system compilation and linking, a region descriptor is formulated that uniquely identifies the region and includes information that allows access to the template when the region is later created (during run-time execution). Also during compilation and linking, each execution point of a procedure that requires the region data is coded with instructions that invoke a run-time routine for dynamically allocating, initializing and referencing the required region.

More specifically, when a procedure is executed and a point of execution is reached that requires access to a region, a determination is made as to whether the required region was created during an earlier portion of the execution of the procedure. If the region has not been created, the region descriptor is utilized to access the template that includes the original or base copy of the data for the region and the region is created by copying the data included in the template into system memory at a known address. The address of the region is then stored in memory in a manner that allows the region address to be determined from the region descriptor. Thus, subsequent access to the region that is required in any procedure being executed within the context of the same thread of execution can be made by making use of the region descriptor.

The above-described basic provisions of the invention not only provide efficient memory management in processing data in accordance with one or more procedures that result from a user supplied applications program, but also allow efficient use of multi-threading in processes that utilize routines that are included in a different library of the data processing system (i.e., a shared library environment). Specifically, because the practice of the invention allows the creation of regions as each region is required for continued processing and because a region descriptor is used that need not include the memory address at which a region will be created, regions can be created for shared library routines in the above-described manner. More particularly, in situations in which programs or libraries are expressly linked prior to loading procedure and data into memory for execution, regions are created in a manner that allows a region to be shared between all procedures executed within the context of any particular thread (even if the procedure is from the shared library). If two or more procedures of libraries are loaded for execution in the same memory space without linking all procedures against one another, regions can be shared between the linked procedures, but cannot be shared with a procedure that is not linked to all other procedures that use the region.

The invention provides yet another advantage, which will be better recognized upon understanding the detailed operation of the invention. Specifically, the manner in which the invention is implemented is not dependent upon or restricted to any particular high level programming language. Instead, the invention is implemented in a generalized manner so that it will support, and can be used in, data processing systems which are capable of combining program parts that are written in different languages.

BRIEF DESCRIPTION OF THE DRAWINGS

The above discussed advantages and others will become apparent to those skilled in the art with reference to the following description taken in conjunction with the accompanying drawings, in which:

FIG. 4 is a flow chart that illustrates the manner in which the data processing system compiler contributes to and supports the invention;

FIG. 5 is a flow chart that illustrates the manner in which the system linker contributes to the invention;

FIG. 6 is a flow chart that illustrates additional steps of a linker-loader sequence that can be used for maintaining unique region descriptors when two image files are combined for execution in the same memory space;

FIG. 7 depicts a thread private storage table that can be used to further enhance the performance of the invention in situations in which the procedures executed by the threads of execution require access to a substantial number of regions; and FIG. 8 is a flow chart that illustrates a sequence for creating the thread private storage table of FIG. 7.

DETAILED DESCRIPTION

Figure 1:
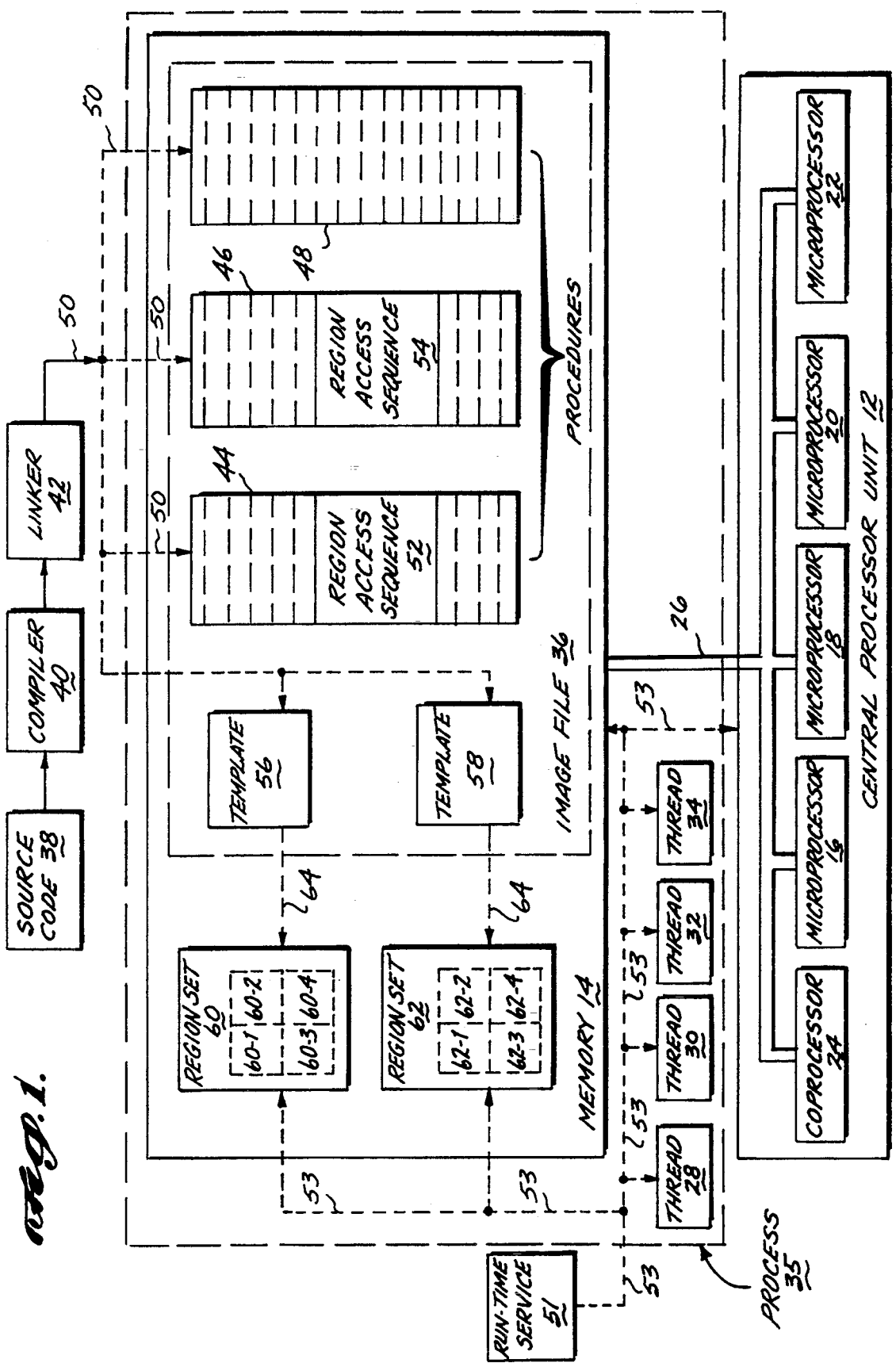
FIG. 1 depicts, in block diagram form, a multi-thread data processing system that is configured and arranged in accordance with this invention to provide thread private data storage in which procedures that are executed by the multiple threads are each provided with identical copies of required initial data (regions)

FIG. 1 diagrammatically depicts a portion of a digital data processing system which provides an environment that supports multi-thread processing in accordance with this invention. Included in the digital data processing system is a central processor unit 12 and a memory 14. Not shown in FIG. 1 are input/output devices which permit a user of the data processing system to provide coded instructions and/or input data and, in addition, permit the user to receive desired information such as the final result of the process and other information that is necessary either to continue execution of the process or analyze premature termination of the process.

In FIG. 1, central processor unit 12 includes four microprocessors 16, 18, 20 and 22, which communicate with memory 14 and a co-processor 24 via an address and data bus 26. In the data processing implementation to be described relative to FIG. 1, co-processor 24 controls microprocessors 16, 18 and 22 in a manner that allows concurrent (parallel) processing. In this regard, in the illustrated arrangement, the microprocessors 16, 18, 20 and 22 are utilized to implement threads of execution 28, 30, 32 and 34. In the exemplary implementation of the invention that is described hereinafter, there is a one-to-one correspondence between threads 28, 30, 32 and 34 and microprocessors 16, 18, 20 and 22. That is, microprocessor 16 is utilized for executing thread 28; microprocessor 18 is utilized for executing thread 30; microprocessor 20 is utilized for executing thread 32; and microprocessor 22 is utilized for processing thread 34. Upon understanding the manner in which the invention is practiced relative to the arrangement of FIG. 1, it will be recognized by those skilled in the art that the invention has application to a wide range of multi-threading digital data processing environments, regardless of the number of processors and the number of multiple threads employed in those environments.

As is indicated by dashed outline 35 of FIG. 1, the memory space provided by memory 14 and threads of execution 28, 30, 32 and 34 make up the process that is to be executed by the data processing system. More specifically, and as shall be described in greater detail, process 35 includes addressable memory 14, which can be shared by the process threads 28, 30, 32 and 34 for execution of user supplied data processing programs (e.g., applications programs).

In the arrangement of FIG. 1, memory 14 includes an image file 36 which results when a compiled and linked user supplied program (e.g., an applications program) is loaded into memory 14. Thus, image file 36 includes the data and coded instructions that are required in order to execute process 35. In the diagram of FIG. 1, the source code that results in executable instructions and provides data required for process 35 is represented by source code block 38; the program that translates the programming language utilized in formulating the source code is represented as compiler 40; and, the service routine that converts the output of compiler 40 (object files) into a form that can be loaded into image file 36 of memory 14 and executed by central processor 12 is represented by linker 42.

Image file 36 of FIG. 1 is depicted as including three procedures 44, 46 and 48, each of which includes a sequence of executable instructions that are stored at consecutive memory addresses within image file 36. For purposes of describing the invention, it is assumed that each thread of execution 28, 30, 32 and 34 executes procedure 44 and also executes procedure 46. Further, it is assumed that execution of procedure 44 requires initialization data that is supplied by source code 38 and that execution of procedure 46 requires different initialization data that also is supplied by source code 38. As is indicated by dashed line 50 of FIG. 1, procedures 44, 46 and 48 are loaded into image file 36 and are prepared for execution after completion of the linking procedure. Although not expressly indicated in FIG. 1, a service routine often referred to as a loader performs the necessary memory loading and preparation of the code for execution.

The exemplary data processing arrangement of FIG. 1 also includes a service routine for controlling operation of the data processor during execution of procedures 44, 46 and 48. In FIG. 1, this service routine is identified as run-time service 51. As is indicated by dashed arrow 53, run-time service 51 provides the control and support that is required by central processor unit 12 and memory 14 for execution of threads 28, 30, 32 and 34.

It will be recognized by those skilled in the art that the above-discussed features of FIG. 1 are typical of a multi-threading data processing arrangement that is configured and organized for parallel processing with four microprocessors. Attention is now directed to features of FIG. 1 that more specifically relate to the practice of this invention. First, prior to the time at which image file 36 is loaded into memory 14, procedures 44, 46 and 48, compiler 40 and linker 42 formulate the procedures so that the points of execution that require initialization data are identified in a manner that will allow copies of the data ("regions") to be created and brought into memory 14 on an as needed basis. In FIG. 1, the execution points requiring initialization data are identified by "region access sequences," with procedure 46 including a region access sequence 52, which requires one particular set of initialization data, and procedure 48 including a region access sequence 54, which requires a different set of initialization data. As shall be described in more detail relative to FIGS. 2 and 3, during execution of procedures 44 and 46, region access sequences 52 and 54 respectively cause the creation of a copy of the required data (a "region") for use in continued execution of the related procedure. Since an additional region is created by execution of procedures 46 and 48 when the procedures are run in the context of threads 28, 30, 32 and 34, regions that are private to each thread 28, 30, 32 and 34 are established, thus isolating each thread from data modification that may occur during earlier execution of a procedure in the context of a different thread.

In addition to contributing to the practice of the invention by supplying region access sequences 52 and 54 to procedures 44 and 46, compiler 40 and linker 42 formulate templates that include a base or original copy of the data that is required for creation of each region when the data is required by procedures that are executed by the threads. In the arrangement of FIG. 1, image file 36 is shown as including a template 56 that contains a base or original copy of initialization data required by region access sequence 52 of procedure 44 and a template 58 that contains a base or original copy of initialization data required by region access sequence 54 of procedure 46. As shall be described hereinafter, templates 56 and 58 also include coded information that is useful in creating the regions and can include coded information that is employed for accessing a region after it has been created.

In FIG. 1, memory 14 is depicted as including a set of regions 60-1, 60-2, 60-3 and 60-4 (region set 60) and a set of regions 62-1, 62-2, 62-3 and 62-4 (region set 62). As is indicated by arrows 64, each region 60-1, 60-2, 60-3 and 60-4 of region set 60 is formed from data included in template 56 and each region 62-1, 62-2, 62-3 and 62-4 of region set 62 is formed from the data included in template 58. Although FIG. 1 correctly indicates the relationship between the region sets and the templates, it should be noted that the desired thread-private relationship also is established. Specifically, in FIG. 1: regions 60-1 and 62-1 are private to thread 28; regions 60-2 and 62-2 are private to thread 30; regions 60-3 and 62-3 are private to thread 32; and regions 60-4 and 62-4 are private to thread 34. Thus, when threads 28, 30, 32 and 34 execute procedures 44 and 46, each thread will have available to it a copy of the proper initialization data.

Compiler 40 and linker 42 also establish a region descriptor (not shown in FIG. 1) for each original or base set of data. Thus, the region descriptor uniquely identifies the template in which is stored a base or original copy of one set of initialization data. This region descriptor, which does not contain the address at which a region will be stored, is utilized during execution of the procedures to dynamically create the regions on a per thread, as needed basis, and to provide any required subsequent access to a created region. In the currently preferred embodiments of the invention, the region descriptor consists of the memory address at which the corresponding template is stored when the image file 36 is loaded into memory 14 and an index number (1, 2, . . .) which is assigned to each separate data set by linker 42.

Figure 2:
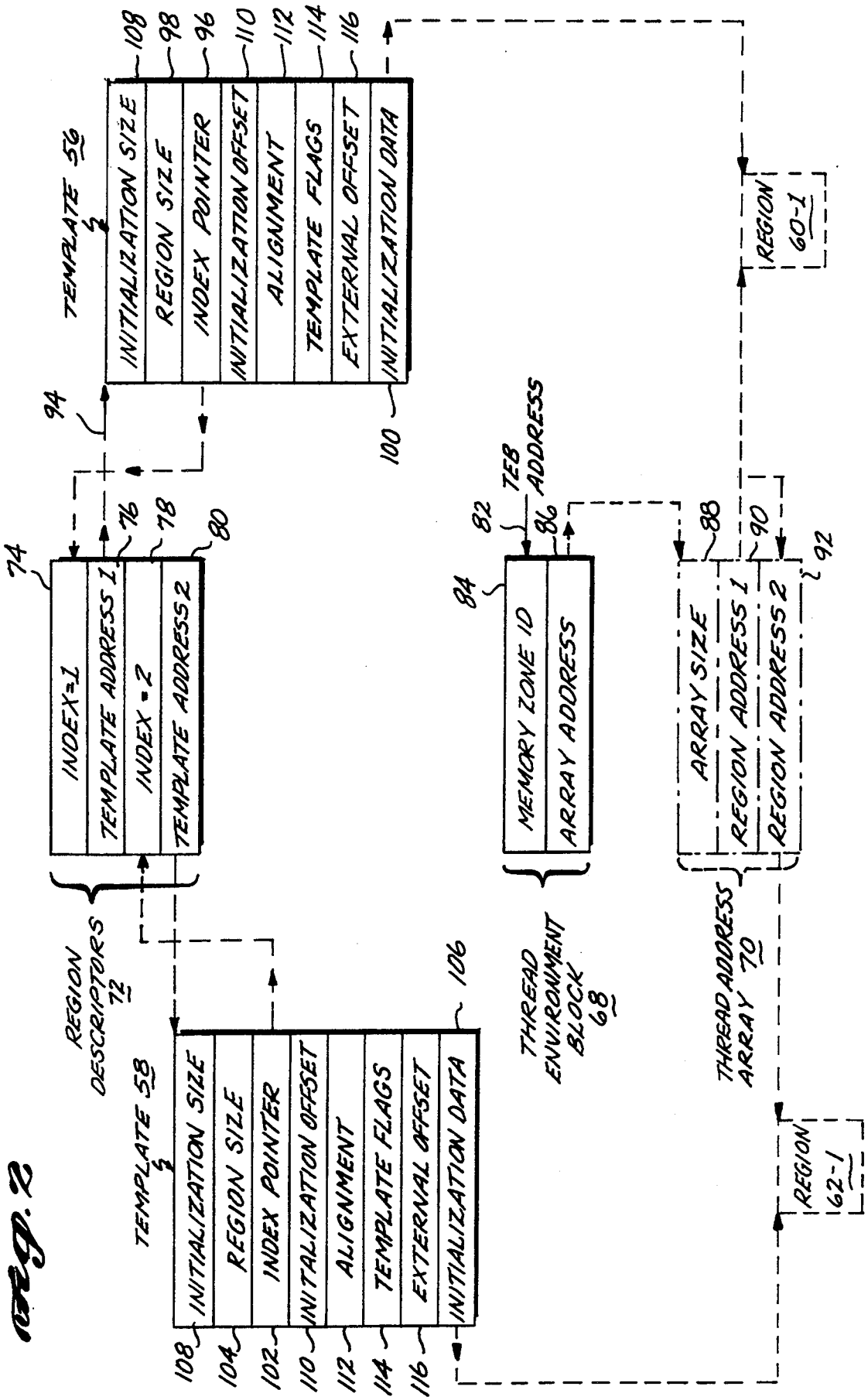
FIG. 2 depicts the various memory stored attributes of the threads, templates that are used to establish the regions, and region descriptors that are used in the practice of the invention.
Figure 3:
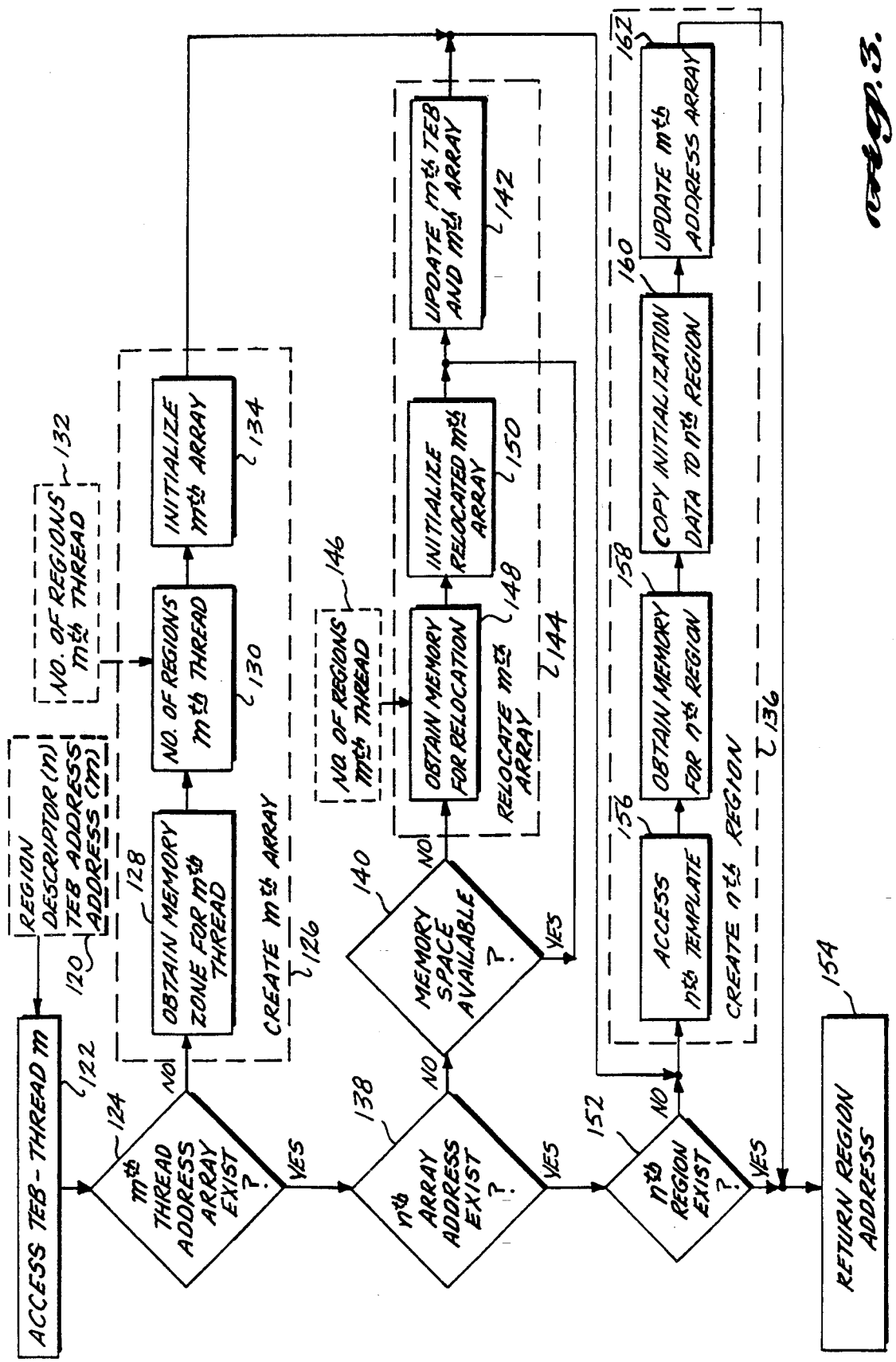
FIG. 3 is a sequence diagram or flow chart that illustrates a sequence that can be utilized in accordance with the invention to create and access the regions of FIG. 1 during execution of procedures that require the data included in those regions.

The manner in which the currently preferred embodiments of the invention create and access regions can be understood with reference to FIG. 2, which depicts various attributes and elements that are stored in memory and utilized for region creation and access and, further, with reference to the flow chart of FIG. 3, which illustrates various steps performed by the data processing system during region creation and access. After describing the region creation and access provisions, a description is provided of the manner in which the compilation and linking operations of the data processing system (e.g., compiler 40 and linker 42 of the arrangement shown in FIG. 1) provide the templates and otherwise contribute to and support the practice of the invention.

In turning to FIG. 2, it should be noted that the depicted arrangement specifically illustrates attributes and elements that are stored in memory 14 of FIG. 1 when one of the threads 28, 30, 32 or 34 executes procedures 44 and 46. For descriptive purposes, FIG. 2 illustrates only the memory storage applicable to thread 28, which will cause generation of (and access to) regions 60-1 and 62-1 of FIG. 1. It will be recognized upon understanding the arrangement of FIG. 2 and the flow related chart of FIG. 3 that:

(a) execution of procedures 44 and 46 by each of the other threads 30, 32 and 34 will result in separate memory storage of attributes and elements that are of a form that is identical to what is shown in FIG. 2 (only attribute and data element values will be different to reflect proper values for the related thread); and (b) more important, operation of the invention in accordance with FIGS. 2 and 3 is not limited to the arrangement of FIG. 1—the invention can be practiced in a wide range of multi-threading environments regardless of the number of threads and regions that need to be accommodated.

Referring specifically to FIG. 2, the region access and creation sequence employed by the currently preferred embodiments of the invention basically involves:

(a) accessing attributes of the thread that are identified in FIG. 2 as a thread environment block 68;

(b) determining from thread environment block 68 the memory location of a thread address array 70;

(c) accessing a region address field of thread address array 70 to determine whether the region to be accessed already has been created;

(d) accessing the region if it has been created; or (e) in the event the region has not been created, accessing the template that includes the original or base copy of the required initialization data to create the region.

In addition to these basic steps, the currently preferred embodiments of the invention operate so that memory space for the thread address array 70 is not allocated until initiation of the first region access sequence of that thread. Thus, for the example being considered, thread address array 70 of FIG. 2 (which is associated with thread 28) does not exist in memory until region access sequence 52 of procedure 46 (FIG. 1) is being executed in the context of thread 28. In FIG. 2, thread address array 70 and regions 60-1 and 62-1 each are shown in dashed outline to indicate that these elements exist in memory only after being created during the course of the region access sequences associated with procedures 44 and 46.

Two attributes are necessary to access and create thread private regions in accordance with arrangements of FIGS. 2 and 3: the descriptor for the region and memory address of the thread environment block for the thread. As was mentioned relative to describing the system of FIG. 1, during the system linking operation each set of initialization data for which regions will be formed is assigned a unique index number from the consecutive set of non-zero integers and the set of initialization data is included in a template. In the currently preferred embodiments of the invention, the index number and the memory address at which the corresponding template is loaded into memory are utilized as the region descriptor. With regard to describing the arrangement of FIG. 2, it is assumed that linker 42 assigned an index of "r" to the initialization data required by region access sequence 52 of procedure 44 and assigned an index number of "2" to the initialization data required by region access sequence 54 procedure 46. Thus, region descriptors 72 in FIG. 2 consist of four consecutive memory fields 74, 76, 78 and 80 in which the first pair of fields (74 and 76) specify the region descriptor for creating thread private regions 60-1 (index=1, in field 74 and template address 1 in field 76) and the second pair of fields (78 and 80) specify the region descriptor for thread private region 62-1 (index=2 in field 78 and template address 2 in field 80).

Since the starting memory address of region descriptors 72 is known when the region descriptors and all other compiled and linked sections of code are loaded into memory, the region descriptors can be easily obtained during process execution for use in creating and accessing regions. This also is true of the address of the thread environment block, which is the other attribute that is required for creating and accessing regions. Specifically, thread environment block (68 in FIG. 2) is generated by the data processing system prior to the time at which the associated thread (thread 28 in the example being described) begins execution of procedures that are within the context of that thread (procedures 44 and 46 in the example being considered). With respect to the generation of thread environment block 68 by the data processing system, those skilled in the art will recognize that various known techniques exist in which a variety of attributes and information related to a thread are generated and stored in the context of the thread prior to execution of a multi-threading process. For clarity of description, thread environment block 68 of FIG. 2 depicts only attributes and information that specifically relate to the practice of the invention. To facilitate the hereinafter described operation of the currently preferred embodiments of the invention in creating and accessing regions, all fields of the depicted thread environment block 68 are initialized at a predetermined value ("0" for purposes of this discussion), prior to the time at which the associated thread (thread 28 in the example being described) begins executing a procedure that requires access to a region (procedures 44 and 46).

As previously noted, in the example under consideration, procedure 44 is the first procedure that is executed within the context of thread 28. When the procedure reaches the point of execution at which region access sequence 52 is to be undertaken, the memory address for the thread environment block is determined (e.g., by executing a run-time routine or by a call to the data processor operating system). As is indicated by arrow 82 in FIG. 2, the address of the thread environment block ("TEB address") in effect is a pointer that points to a field of the thread environment block 68 that is identified as memory zone identification field 84, the use of which will be described hereinafter. Having located the thread environment block, the system accesses an array address field 86. As was previously noted, when thread environment block 68 was created, a value of zero was stored in each of the fields. In the example being discussed, the data processing system is making its first region access for thread 28 and, thus, thread address array 70 has not yet been created. Finding the predetermined value (0) in array address field 86, the system sequences in a manner that obtains memory space for creation of thread address array 70 and initializes the elements of the array. The memory address of thread address array 70 is then written into array address field 86 of thread environment block 68 for use during subsequent creation and accessing of regions.

As shown in FIG. 2, the thread address arrays utilized in the currently preferred embodiment of the invention include a field which stores a value equal to the number of regions utilized in execution of the associated thread (array size field 88 in FIG. 2; array size=2, in this example). Following the array size field is a series of region address fields for indicating the memory addresses of the regions that are created (region address1 field 90 and region address2 field 92 in FIG. 2. When the thread address array 70 is created, all address fields are initialized with a value of zero. During each region access sequence, the region descriptor index is utilized to locate the particular address field that is associated with the region being accessed. Thus, the region address fields form an ordered set which corresponds to the set of region indexes of the associated thread. If the region being accessed has not been created the accessed region address field will hold the initialization value (0). Once the region has been created in the hereinafter described manner, the accessed region address field will hold the region address.

In the example being discussed, no previous attempt has been made by the system to access region 60-1, and, thus, region address field 90 holds a value of zero. To create region 60-1, template 56 is accessed, using template address field 76 of region descriptors 72. Contained in each template utilized in the currently preferred embodiments of the invention is a region size field 98, which contains a coded representation of the amount of memory space needed for storing the initialization data (the size of the region to be created). Accessing region size field 98, the system obtains memory at an available memory address and copies the template initialization data (indicated in field 100 of template 56) at that address to form the required region 60-1. The memory address for region 60-1 is then stored in region address1 field 90 of thread address array 70.

Subsequent to creation of region 60-1, a procedure executed within the context of thread 28 that includes a region access sequence for accessing the data of region 60-1, will access the region using only the TEB address and the region index. Specifically, thread environment block 68 is accessed with the TEB address; the address field 86 of thread environment block 68 directs the system thread address array 70; and the region index (which is equal to 1) causes the system to access the address of region 60-1, which is stored in region address1 field 90. In some embodiments of the invention, it is possible to cache region addresses thereby allowing access to previously created regions without accessing the thread environment block and thread address array in the manner described above.

Region 62-1 of FIG. 2 is created in the same manner as is utilized to create region 60-1, except that thread address array 70 will already exist. More specifically, in the example being described, when procedure 46 is executed within the context of thread 28, region access sequence 54 will cause the data processing system to access thread environment block 68 to obtain the address of thread address array 70. Utilizing the region index for region 62-1 (which is equal to 2 and is stored in field 78 of region descriptors 72), access is then made to region address2 field 92 of thread address array 70. Since region 62-1 has not previously been created, the region address2 field 92 does not contain the address of the region, but contains the previously discussed initialization value of zero. This causes the data processing system to access template 58, using the memory address stored in template address2 field 80. The data processing system then sequences using the region size field 104 and initialization data field 106 of template 58 to establish region 62-1 at an available memory address in the same manner as was discussed relative to creation of region 60-1. Upon creation of region 62-1, its address is stored in region address2 field 92 of thread address array 70. As was discussed relative to region 60-1, any subsequent access to region 62-1 can be made using the TEB address and the index for region 62-1 or, alternatively, the address of region 62-1 can be reached.

Templates 56 and 58 of FIG. 2 include fields in addition to those that are used in the above discussed manner to create regions 60-1 and 62-1. In the currently preferred embodiment of the invention, these additional fields are utilized to store coded information that can be useful both for the practice of the invention and useful for other purposes. One example of a field contained in template 56 and 58 that is not required for the practice of the invention is initialization size field 108, which stores coded information that relates to the size of the region associated with the templates. In the currently preferred embodiments of the invention, the initialization size fields 108 are utilized for procedures and routines that perform "bookkeeping" or auditing tasks. In addition, in the currently preferred embodiments, the initialization size fields 108 store a predetermined value (e.g., "0") in situations in which the associated template does not include initialization. As shall be described relative to template flags field 114 and external offset field 106, templates without initialization data are present, for example, in situations in which the initialization data is included in a different template (e.g., included in a template that is associated with a shared library).

Another example of template 56 and template 58 fields that are not necessary for the practice of the invention is inclusion of the initialization offset fields 110. These fields are included in one realization of the invention to facilitate future expansion of the templates to include additional coded information that may be required to expand the capabilities of the invention. In the referenced realization of the invention, the initialization offset fields 110 store the byte offset from the beginning address of the template to the first field of the template that includes initialization data. As will be recognized by those skilled in the art, such an offset can be used to access the initialization data of a template, regardless of the number of fields that exist between the template beginning address and the address of the initialization data. Yet another example of template 56 and 58 fields that are useful for purposes that do not relate to primary aspects of the invention is an index pointer field (96), which provide self-relative offset pointers to stored region indexes for the templates 56 and 58 (region descriptor fields 74 and 78 in FIG. 2). The currently preferred embodiments in the invention utilize an index pointer of the type described in order to maintain the templates as read-only sections of coded data. The region indices cannot be stored in read only sections of memory because, as shall be discussed relative to dynamically loaded procedures, the region indices can change during execution of a multi-threading process.

Alignment fields 112 of templates 56 and 58 are useful in embodiments of the invention that are configured for operation in a data processing environment which is capable of combining program parts that are written in different programming languages. Specifically, alignment fields 112 are coded during the linking operation to indicate the number of binary zeros needed in order to supplement or "pad" the stored initialization data so that it is compatible with the system data bus.

The template flags fields 114 of templates 56 and 58 can be utilized for various purposes. For example, a flag contained in this field can indicate that initialization data included in the template is stored in a compressed format. In the currently preferred embodiments of the invention, the template flags fields 114 and the depicted external offset field 116 are respectively used to indicate that the initialization data for the region being accessed is included in a different template and to direct the system to that template. In this regard, in embodiments of the invention in which threads of execution include procedures that invoke or call another procedure that is stored in a different or shared library, initialization data required by the called procedure may be located in a template of the calling procedure. As shall be described in more detail, if this occurs and if the code for the calling and called procedures is expressly linked prior to the time at which the process is loaded into system memory, the system linking operation will:
  (a) establish a memory field in the process memory file (e.g., image file 36 of FIG. 1);
  (b) set the template flags field 114 of the template which does not contain the initialization data to indicate that the required initialization data is included in a different template;
  (c) code the external offset field 116 of the template that does not include the initialization data with an offset pointer to the memory address of the field that was created by the linking code of the calling procedure against the code of the called procedure; and (d) code the address of the shared library template into the provided field.

Thus, in a situation in which the initialization data required for creation of a region is in a different template, the only exception to the region creation and access discussed relative to procedures 44 and 46 is that the occurrence of a template flag that indicates the initialization data is in a different template will cause the system to access the different template using the offset pointer stored in external offset field 116.

As is indicated in FIG. 2, thread environment block 68 also can include additional fields that are useful in practicing the invention, but are not required in the previously discussed primary sequence for creating and accessing regions. For example, included in thread environment block 68 of FIG. 2 is a memory zone identification field 118. In the currently preferred embodiments of the invention, memory zone identification field 118 is initialized at a value of 0 when the thread environment block is created, thus indicating that a thread private memory zone for storing the thread address array and regions for the thread has not yet been allocated. During the sequence in which the data processing system creates the thread address array (i.e., during the sequence in which the first region for the thread is created and accessed), the system obtains a memory zone for storing the thread address arrays and the regions that will be created and codes memory zone identification field 118 with the identification of that memory zone. During execution of procedures, the data processing system can use this field in various manners to manage the virtual memory in which storage of the regions and thread address arrays is allocated. In the preferred embodiments of the invention, one of the primary uses of the memory zone identification is releasing the memory zone when execution of a thread is terminated since the thread address arrays and the regions no longer are required. Memory allocated for storage of the thread address arrays and regions can be released by separately locating each thread address array and each region. However, use of the memory zone identifier provides rapid and reliable release, especially in situations in which a large number of regions are created and accessed.

The flow chart of FIG. 3 reflects the above-described sequence in a more generalized form and, further, illustrates additional features of the currently preferred embodiments of the invention. As is indicated in FIG. 3 by dashed outline 120, the sequence used by the data processing system to access and, if necessary, create the nth region of the mth thread requires the region descriptor for the nth region and the address of the mth thread environment block. As was discussed relative to FIG. 2, the region descriptor can be accessed from system memory and the address of the environment block for the mth thread can be obtained from a simple run-time routine or by a call to the operating system. Using the mth TEB address, the system accesses the thread environment block for the mth thread (indicated at block 122 of FIG. 3). As is indicated by decisional block 124, it is then determined whether a thread address array exists for the mth thread. As was described relative to FIG. 2, the array address field (8 in FIG. 2) of the thread environment block will contain a value of 0 if the thread address array does not exist. As is indicated by dashed outline 126 of FIG. 3, if the mth thread address array does not exist, the data processing system undertakes a sequence that creates the address array for the mth thread. The depicted array creation sequence includes allocation of a memory zone for storage of the thread array and all regions created during execution of the mth thread (indicated by block 128). Although not specifically shown in FIG. 3, when the memory zone is established, its identifier is stored in the previously mentioned memory zone identification field of the thread environment block (field 84 in FIG. 2).

The next step in creating the thread address array for the mth thread is obtaining memory space of sufficient size for the creation of the thread address array (indicated at block 130). In the currently preferred embodiments of the invention the space required for the creation of the thread address array is determined on the basis of the number of regions that can be created by the mth thread. In these embodiments, the total number of regions associated with each thread is determined during the system compilation and linking process and is stored in memory. Thus, as is indicated by dashed outline 132 in FIG. 3, the number of regions that can be created by the mth thread (and hence the number of region address fields that must be included in the thread address array) is available for use as an estimate of memory required for the thread address array. After obtaining memory space, the fields of the mth thread address array are initialized at a value of 0 (block 134) and the address of the thread address array is written into the array address field of the thread environment block. The data processing system then proceeds to create the first region for the mth thread, i.e., advances to the "create mth region" sequence which is enclosed by dashed outline 136 in FIG. 3 and shall be discussed hereinafter.

If it is determined at decisional block 124 that the thread address array for the mth thread exists (i.e., that one or more regions for the mth thread already have been created), a determination is then made as to whether the thread address array includes a field for indicating the address of the nth region (indicated by decisional block 138 in FIG. 3). As discussed relative to creation mth array, the array is established with a number of array address fields equal to the number of regions that can be created by the mth thread. However, the number of regions that can be created by the mth thread can change if one or more additional procedures that are executed within the context of the mth thread are dynamically loaded into memory at some point during execution of other procedures that are within the context of the mth thread. For example, a procedure executing within the context of the mth thread may call one or more procedures of a shared library which are not loaded into memory until called. If the execution of called library procedures also requires creation of and access to one or more regions, the number of regions that can be created by the mth thread will increase when the library procedure is loaded into memory. Decisional block 138 can detect such a change in the number of regions associated with the mth thread by determining whether the region descriptor index of the nth region is greater than the value stored in the array size field of the thread address array.

When it is determined at decisional block 138 that the thread address array does not include a field for the nth region, it next is determined whether memory space is available for extending the thread address array (indicated at decisional block 140 in FIG. 3). That is, the data processing system determines whether additional memory space is available that is contiguous to the last address field of the thread address array (i.e., the (nth−1) address field). If sufficient memory space is available for extending the thread address array to include a field for the address of the nth region, the data processing system allocates the space and appropriately updates the thread address array for the mth thread. Specifically, the thread address array is updated so that the value stored in the array size field (88 in FIG. 2) is incremented by 1 and the newly created region address field of the thread address array is initialized at a value of zero (indicated at block 142 in FIG. 3). Upon completion of the update procedure, the data processing system advances to the "create nth region" sequence that is included within dashed outline 136 of FIG. 3.

If it is determined at decisional block 140 that memory space contiguous to the last field of the thread address array does not exist, it is necessary to relocate the thread address array for the mth thread to a region of the allocated memory zone that provides adequate memory space. In the currently preferred embodiments of the invention, relocation of the thread address array is effected in the manner in which the array will be extended to accommodate all additional regions that have been added to the process by, for example, dynamically loading a procedure of a shared library that creates and accesses a number of regions. As shall be described relative to FIG. 6, when a procedure of a shared library or any other image file is dynamically loaded into memory, the previously mentioned memory field that stores a count of the number of regions that can be created by the mth thread is updated to store a value that is equal to the sum of the regions for the existing image file and the number of regions that can be created and accessed by the dynamically loaded image file (indicated at block 146 in FIG. 3). Using this updated number of regions for the mth thread, the system obtains sufficient contiguous memory space for relocation of the thread address array (block 148 in FIG. 3). As is indicated by block 150, the relocated thread address array is then initialized and updated so that the array size field (88 in FIG. 2) stores the total number of region addresses that can be held by the array; the region addresses for the first (n−1) regions are copied from the original thread address array; and all remaining region address fields (beginning with the nth address field) are initialized at a value of zero. In addition, as is indicated at block 142 the mth thread environment block is updated so that the array address field indicates the memory address of the relocated thread address array. With the thread address array relocated, the system advances to the create nth region sequence 136 in FIG. 3.

If it is determined at decisional block 138 that the address array for the mth thread includes a region address field for the nth region, the data processing system determines whether the nth region already has been created. This operation is indicated at decisional block 152 of FIG. 3 and, as was discussed relative to FIG. 2, consists of using the region descriptor index to access the address field for the nth region. If the address field stores a value of zero, the region has not been created and the system advances to the sequence for creating the nth (included in dashed outline 136 of FIG. 3). On the other hand, if an address exists in the region address field for the nth region, the address is returned to the procedure that requires the initialization data of the nth region (indicated at block 154 in FIG. 3).

The sequence utilized for creating the nth region consists of the steps discussed relative to FIG. 2. Those steps are:
 (a) using the template address contained in the region descriptor for the nth region to access the template for the nth region (indicated at block 156 of FIG. 3);
 (b) obtaining addressable memory space for the storing of the data for the nth region (block 158);
 (e) copying the initialization data contained in the template for the nth region into the memory space that has been obtained (block 160);
 (d) updating the thread address array for the nth region so that the region address field for the nth region stores the memory address at which the region has been created (indicated at block 162 of FIG. 3). The region address for the nth region is then returned to the procedure requiring the data of the nth region (block 154).

Once the region address for the nth region is returned to the procedure requiring the data of that region, the system continues to execute the procedures of the mth thread. Each time a region access sequence is encountered in those procedures, the routine described relative to FIG. 3 is repeated.

It was pointed out during the foregoing discussion of the manner in which the invention operates to create and access regions that the compilation and linking procedures of the data processing system support and contribute to the practice of the invention. Specifically, during the compilation and linking sequences that form the procedures for each thread:
 (a) a template is formulated for each set of initialization data (each region);
 (b) a region descriptor is formulated for each region, with the region descriptor including both an index that is associated with the template for the region and the memory address of the template;
 (c) a region access sequence is formed for inclusion in the instruction code of the procedures at each point of execution that requires access to a region; and
 (d) a total count of the number of regions in an image file is maintained in a manner that insures that the total count is updated if another procedure is loaded (e.g., a procedure being executed calls a procedure of a shared library).

FIG. 4 is a flow chart that illustrates a portion of a compilation sequence that suitably supports and contributes to the invention. In FIG. 4 at each point of the compilation sequence where the module being processed indicates that the procedure for a thread of execution requires initialization data, the data processing system determines whether the initialization data is included in the program part being compiled or is included in a different program part (indicated at decisional block 164). If the initialization data is included in a different program part, the system generates an instruction that will cause the previously discussed template flag to be set during the linking procedure (indicated at block 166). As is indicated at block 168 of FIG. 4, if the initialization data is included in the program part being compiled, it is stored at an addressable memory address for incorporation in the region template.

Once the instruction for setting the template flag has been formulated or, alternatively, the initialization data has been stored, the system creates a description of the region (indicated at block 170). This description includes a region name, the size of the initialization data, and other information such as the required alignment of the initialization data. Next, as indicated at block 172, the system allocates memory space for the region descriptor (i.e., the region index and the address of the template for the region), which will be determined during the system linking operation. After allocating memory for the region descriptor, the compilation sequence establishes the instructions necessary for initiation of the region access sequence and passes those instructions to the code that defines the procedures to be executed (indicated at block 174). As is indicated at block 176, linker instructions are then established that will cause the system to store the template address and the region index in the previously allocated memory space for the region descriptors. As is indicated by dashed line 177, the sequence is repeated each time an additional set of initialization data or region is encountered during the compilation procedure.

FIG. 5 is a flow chart that illustrates operation of the data processing system when the system provides object code in the manner discussed relative to FIG. 4. In FIG. 5, the first step of the linker procedure that relates to the thread private storage of this invention is indicated at decisional block 178 and consists of determining whether the compiled code includes two or more regions having the same name. As is indicated at block 180, in the event that two or more regions have the same name, the initialization data contributions for all the regions having the same name may be combined into one region of memory utilizing conventional concatenation techniques. As is known to those skilled in the art, these concatenation techniques maintain each data contribution in separately identifiable form. However, if the contribution of one region overlays the contribution of another region with the same name, prior art practice is followed under which only one of the compiled modules contribute to the initialization data. In this regard, in the currently preferred embodiments of the invention, if the contributions are overlaid, the size of the largest contribution is considered to be the region size. Further, the linker uses the initialization data contained in the module that is loaded last.

Once any necessary combination of regions having the same name has been accomplished, the system creates and fills in all previously discussed template fields other than the fields of initialization data. This operation is indicated at block 182 of FIG. 5 and with respect to the previously described templates 56 and 58 of FIG. 2, consists of:

(a) filling in the region size field 108;
(b) filling in the initialization size field 98 to indicate the amount of memory required for creation of the associated region;
(c) filling in the index pointer field 96 to indicate the offset to the field established by the compiler for storage of the region index;
(d) filling in the required alignment data in alignment field 112;
(e) setting the template flags field 114 to indicate whether the initialization data for the region associated with the template is specified by another template; and
(f) if the initialization data is specified by a different template, creating a field in memory (e.g., in the linkage code for the modules being compiled and linked) for storing of the address of the template that includes the initialization data and, in addition, filling in the external offset field 116 of the template to provide an offset pointer to the memory field that contains the address of the template that contains the initialization data.

At this point of the data processing system linker process, the template for the region is complete and the system proceeds to establish the descriptor for the region. In this regard, as was previously discussed, during the system linkage process, the data processing system assigns region indexes that are consecutive non-zero integers (beginning with 1). This assignment of region indexes is indicated at blocks 184 and 186 of FIG. 5, with the region for which a template has been established being assigned the next available integer as its region index (block 184) and a count of the region indexes that is maintained during the linkage procedure being incremented by one (block 186).

As is indicated by dashed line 187, this linkage procedure is repeated for all modules that are being compiled and linked to form a particular image file of the process. Once all of the templates for the image have been established, the region descriptors (region indexes and associated template addresses) are written into the fields established during the compilation sequence (indicated at block 188). In addition, the number of regions associated with that image is stored as was described relative to FIG. 3 (indicated at block 190 of FIG. 5).

As was previously mentioned, in some situations, multiple image files may be generated within the context of a thread and the additional images can include thread private storage regions. In some situations, the images will be explicitly linked together prior to loading the process into the system memory. In other situations, an image such as one that includes a shared library procedure can be dynamically activated and brought into memory when it is referenced (i.e., called) during execution of procedures already in system memory. In all of these cases, it is necessary to establish the region indices of each additional image that is being brought into the process so that the indices for the regions of the image being brought into the process are not the same as indices of regions established for the existing image. For example, if the first image activated has n regions with indices 1, 2, 3, . . . , n, a dynamically activated image with m regions is processed with indexes (n+1), (n+2), . . . , (n+m).

As is indicated in FIG. 6, appropriate region indices for an image being brought into a process can be established by first determining the number of regions that already exist in the image file ( e.g., the number of regions in the activating image; indicated at block 194). The number of existing regions is readily available, since it was stored at block 190 during the above-discussed procedure for linking the existing image. The first index number, i=1, of the image being added to the process (indicated at block 192) is then added to the largest index of the existing image (n) to assign a new index number to the first region of the image being added to the existing image (indicated at block 196). This is then repeated for all region indexes associated with the image being brought into the process (indicated at block 198) so that all region indexes of the image being brought in are appropriately reassigned. As is indicated at block 200, the total count of the regions that will exist for the process is then updated to n+m. Thus, should an additional image subsequently be brought into the process, indexes will be assigned that begin with (n+m+1).

It will be recognized by those skilled in the art that, as described above, the invention includes all the attributes of prior art static storage of initialization data for multi-threading data processing environments. Specifically, regions of program memory are provided with the following four attributes:

(1) a region can be initialized with appropriate data before the region is accessed by the program to provide the required data;
(2) a region exists throughout the duration of the program's thread of execution;
(3) a region may be accessed only during execution of a specific part of the program (e.g., a private region), or a region may be shared among all parts of the program; and
(4) the number of static storage regions that can be included in a program is limited only by the size of the system's memory.

In addition to providing the basic attributes or thread private static storage, the invention provides for dynamically allocating, initializing and referencing regions that are private to each thread of execution on a per thread, as-needed basis. Since the regions need not be created until required during the execution of a procedure (i.e., do not depend upon previously storing each region at a known memory address), the invention operates with low memory overhead and provides satisfactory operation in environments that utilize procedures that are included in a different image file or shared library. Further, the invention is implemented in a manner that allows its use with numerous high level programming languages thereby providing thread private storage in data processing environments in which program parts that are written in different languages are combined to form one or more executable procedures.

Although the thread private storage arrangements and techniques described above provide all of the above-mentioned attributes and features, there are situations in which the invention can be configured to provide even further improvement in data processing efficiency. Specifically, in the above-described arrangement of the invention, the region access sequence (e.g., the sequence of FIG. 3) is executed every time a procedure within the context of the thread requires region access. That is, the region sequence procedure is executed once per region per procedure for each procedure within the thread of execution. In some situations, the procedures will access many regions and thus, will execute the region access sequence numerous times.

Since the address of a thread private storage region that is created in accordance with the invention is fixed for the duration of the thread, a region address alone can be used for subsequent access to the region. This characteristic of the invention can be utilized to reduce the number of times that the region access sequence need be executed to only once per module boundary crossing (i.e., to one region call sequence that is executed once for each image file that is loaded into system memory). Basically, such a reduction in the number of required region access sequences is attained by creating all of the regions for the thread when an image file is loaded into system memory and by establishing an additional region that stores the address for all of the regions. This additional region is identified in FIG. 7 as a module thread private storage table 196, which includes a series of fields 198 for storage of the region indexes and a series of corresponding fields 200 for storage of the associated region addresses. The fields depicted in FIG. 7 are allocated during compilation and module-wide indexes (the indexes illustrated in the fields 198 in FIG. 7) are assigned. Prior to loading the module thread private storage table 196 into system memory with the related image file, the address fields 200 are initialized at a value of zero (or some other predetermined number that does not represent a memory address).

As is indicated at block 202 of the flow chart shown in FIG. 8, when the module thread private storage table 196 and the related image file are loaded into system memory, each globally visible procedure in the module accesses the module thread private storage table. If the table has not been initialized (as indicated by the zeros stored in the address fields 200), the global procedure calls for execution of the region access sequence for each region accessed anywhere in the module (indicated at block 206 in FIG. 8). When the regions are created, the address for each region is stored in the corresponding address field 200 of the module thread private storage table 196 (indicated at block 208 in FIG. 8). Since the module thread private storage array 196 is initialized on the basis of global procedures, all region addresses will be included in the storage table. Thus, after initialization, each region can be accessed by using the region index to refer to the module thread private storage table, rather than executing a region access sequence.

The embodiments of the invention in which an exclusive property or privilege is claimed are defined as follows:

What is claimed is:

1. A thread private storage method performed in a digital data processing system of the type wherein one or more processing units and an addressable system memory are interconnected and are controlled by one or more sets of program instructions for compiling, linking, loading and executing a multi-threading process having multiple threads of execution which invoke and execute procedures that require one or more sets of initialization data, said thread private storage method comprising:

controlling the processing units and addressable system memory with the one or more sets of program instructions during the operation of said system for compiling, linking and loading said multi-threading process to perform the following steps for each thread of said multiple threads of execution:

(a) establishing and storing in system memory a template for each said set of initialization data, each said template being associated with a different set of initialization data, each said template including data identical to its associated set of initialization data;

(b) establishing for each said template an associated descriptor for use in subsequent creation of a copy of said initialization data that is private to each said thread that executes one or more procedures that require the initialization data associated with said template, said descriptor uniquely identifying the template with which it is associated and including information that allows the processing units to locate said template uniquely identified by said descriptor in said system memory at the time of said subsequent creation of said copy of said initialization data;

(c) establishing a sequence of coded instructions for locating said template uniquely identified by said descriptor;

(d) including said sequence of coded instructions in said one or more set of program instructions for controlling said processing units and said addressable system memory; and, controlling the processing units and system memory with the one or more sets of program instructions during execution of said procedure executed by each said thread to perform the steps of:

(a) creating said copy of said initialization data that is private to each said thread by copying into system memory a copy of the set of initialization data required by the procedure, said step of creating said copy being performed at the first point of execution at which said initialization data is required for further execution of said procedure, said copying into system memory being effected by accessing system memory by means of said descriptor that uniquely identifies the template associated with said required set of initialization data to locate the template associated with said required set of initialization data and by copying said initialization data of said template to an available previously unspecified system memory address.

2. The method of claim 1, wherein said step of establishing said descriptor for each said template includes the steps of including in said descriptor a region index that uniquely identifies the template with which said descriptor is associated and, further, including in said descriptor the memory address at which said associated template is stored.

3. The method of claim 2, wherein the step of including a region index in said descriptor of each said template comprises assigning as said region index an integer that uniquely identifies the template associated with said descriptor.

4. The method of claim 3, further comprising the steps of:

allocating a portion of said system memory as region address fields in which the memory addresses for each copy of said initialization data that is created by said method can be stored; and storing a predetermined value in each of said region address fields to indicate that said copy of said initialization data has not yet been created.

5. The method of claim 4, wherein said step of copying into system memory a copy of said initialization data required by a procedure includes the steps of:

accessing system memory to locate the previously established region address field associated with the memory address of the copy of said initialization data required by said procedure;

determining whether the located region address field stores said predetermined value; and in the event said located region address field stores said predetermined value, making said copy of said required initialization data by accessing the stored memory address for the template associated with said initialization data and by storing a copy of said initialization data at an available system memory address.

6. The method of claim 5, wherein said region address fields are formed as an addressable array in said system memory and wherein said step of locating said region address field associated with the memory address of the copy of said initialization data required by said procedure includes the step of using said integer assigned as said region index as an offset value relative to the memory address of said array of region address fields.

7. The method of claim 5 further comprising the step of storing in said region address field associated with the memory address of the copy of said initialization data required by said procedure said available memory address at which said copy of said initialization data is generated.

8. The method of claim 5, wherein said located region address field stores a value other than said predetermined value, and said method further comprises the step of supplying said value stored at said accessed region address field to said procedure requiring said initialization data as the memory address of said copy of said initialization data required by said procedure.

9. The method of claim 4, wherein said region address fields are formed as an addressable array in system memory and wherein said method further comprises the steps of establishing an array address field in said system memory for each thread; and storing a predetermined value in said array address field; and said step of establishing said address array field being performed subsequent to said step of allocating a portion of said system memory as region address fields and prior to a time at which a procedure requires a set of initialization data.

10. The method of claim 9, wherein said step of allocating a portion of said system memory as region address fields is performed at the first point of execution of said procedure at which said initialization data is required for further execution of said procedure; and wherein said step of copying into system memory a copy of said initialization data required by a procedure includes the steps of:

accessing said array address field in said system memory;

determining whether said array address field stores said predetermined value; and in the event said array address field stores said predetermined value, performing said steps of allocating a portion of said system memory for storage of said array of region address fields in which the memory addresses for each copy of said initialization data that is required by said thread can be stored; and upon allocation of said portion of said system memory for storage of said array, storing the memory address of said array in said address array field.

11. The method of claim 10, wherein said step of copying into system memory a copy of said initialization data required by a procedure further includes the steps of:

determining from said address array field said memory address of said array of region address fields;

accessing said array in system memory with said address of said array;

locating in said array the region address field associated with the initialization data required by said procedure;

determining whether the located region address field stores said predetermined value;

in the event said accessed region address field stored said predetermined value, making said copy of said required initialization data by accessing the stored memory address for the template associated with said initialization data; and storing a copy of said initialization data at an available system memory address.

12. The method of claim 11, further comprising the step of storing in said region address field associated with the memory address of the copy of said initialization data required by said procedure said available memory address at which said copy of said initialization data is generated.

13. The method of claim 11, wherein said accessed region address field stores a value other than said predetermined value and said method further comprises the step of supplying said value stored at said located region address to said procedure requiring said initialization data as the address of said copy of initialization data required by said procedure.

14. The method of claim 10, wherein said step of accessing said region address field associated with the memory address of the copy of said initialization data required by said procedure includes the step of using said integer assigned as said region index as an offset value relative to the memory address of said array of region address fields.

15. The method of claim 9, wherein said step of copying into system memory a copy of said initialization data required by a procedure further includes the steps of:
   accessing said array address field in said system memory;
   determining from said array address field said memory address of the previously established array of region address fields;
   accessing said array in system memory with said address of said array;
   locating in said previously established array the region address field associated with the initialization data required by said procedure;
   determining whether the located region address field stores said predetermined value;
   in the event said accessed region address field stores said predetermined value, making said copy of said required initialization data by accessing the stored memory address for the template associated with said initialization data and by storing a copy of said initialization data at an available system memory address.

16. The method of claim 15, further comprising the step of storing in said region address field associated with the memory address of the copy of said initialization data required by said procedure said available memory address at which said copy of said initialization data is generated.

17. The method of claim 16, wherein said accessed region address field stores a value other than said predetermined value and said method further comprises the step of supplying said value stored at said located region address to said procedure requiring said initialization data as the address of said copy of said initialization data required by said procedure.

18. A thread private storage method performed by a digital data processing system of the type wherein one or more processing units and an addressable system memory are interconnected and are programmed by one or more sets of program instructions for compiling, linking, loading and executing a multi-threading process having multiple threads of execution which invoke and execute procedures that require one or more sets of initialization data, said thread private storage method comprising:
   during the programmed operation of said system for compiling, linking and loading of said procedures and for each said thread of execution, controlling said one or more processing units and the addressable system memory to perform the steps of:
   establishing and storing in system memory a template for each said set of initialization data that is required by the procedures executed by a thread, each said template including the initialization data for a particular set of initialization data required by one of said multiple threads of execution;
   selecting and storing a region descriptor in system memory for subsequent use in creating regions in system memory that store a duplicate copy of said initialization data for each procedure that requires a set of initialization data, each said region descriptor including the memory address of a template that includes a particular set of initialization data and including a region index that uniquely identifies a region to be established in system memory when that particular set of initialization data is first needed for use in one of said procedures of one of said multiple threads of execution, said region being stored in system memory at an address that is determined at said time at which said initialization is first needed;
   establishing a sequence of program instructions that are executable to locate the memory storage address of the template that includes said particular set of initialization data;
   including said sequence of program instructions in at least one of said one or more sets of program instructions so that said particular template will be located in execution of said multi-threading process when said particular set of initialization data is first needed for use in one of said procedures of said multiple threads of execution; and
   during the programmed operation of said system for execution of each procedure executed within the context of a thread;
   establishing from said templates said regions in memory that store said duplicate copy of said initialization data, said step of establishing each of said regions being performed by said digital data processing system in response to said sequence of program instructions, said step of establishing each said region being performed at the first point of execution at which a procedure within the context of a thread that requires the initialization data associated with a particular template, said step of establishing each of said regions including the steps of accessing the region descriptor that is stored in system memory and is associated with the template that includes said particular initialization data, locating said template that includes said particular initialization data in system memory based upon the memory address included in said accessed region descriptor, and copying the set of initialization data included in said accessed template; each of said regions being private to a thread to provide each said thread a copy of each set of initialization data required by the procedures that are executed within the context of that thread.

19. The method of claim 18, wherein each said region is established by:
   determining from said region descriptor the memory address of said template: accessing the template in system memory that includes the required initialization data; and copying into system memory at an available system memory address one of said regions that includes a duplicate copy of the initialization data included in said template.

20. The method of claim 19, wherein said step of establishing each said region includes the step of storing in system memory the memory address for each said region established, and wherein any subsequent access to said generated region includes the steps of accessing said stored memory address of said region and addressing system memory with said memory address to access initialization data stored in said region.

21. The method of claim 20, wherein each said memory address for each said region is stored in system memory as an array of consecutive region address fields, the particular region address field occupied by each said address being determined by said region index and the memory address of said array of region address fields.

22. The method of claim 21, wherein, during the operation of said system for compiling, linking and loading of said procedures, each said region address field is loaded with a predetermined value that indicates that the region associated with that region address field has not yet been established.

23. The method of claim 22, wherein the step of establishing each said region comprises the steps of:
  accessing from system memory the region address field associated with said region to be established;
  determining that said region address field stores said predetermined value;
  accessing with said memory address of said region descriptor the template that is stored in system memory and includes initialization data for said region to be established;
  determining an available system memory address for storing a duplicate copy of said initialization data;
  copying said initialization data at said available memory address to establish said region; and
  storing said available memory address in said region address field associated with said region being established so that subsequent access can be made to said region without accessing said template and copying said initialization data.

24. The method of claim 22, further comprising the step of
  establishing in system memory an addressable array address field for storing the address of said array of consecutive region address fields.

25. The method of claim 24, wherein said step of establishing each said region in system memory includes the steps of:
  accessing said array address field in system memory to determine the memory address of said array of region address fields; and
  accessing said array of region address fields with said address of said array of region address fields, and
  locating within said array the region address field for said region.

26. The method of claim 24, wherein, during the operation of said system for compiling, linking and loading of said procedures, said array address field is loaded to store a predetermined value and wherein said array of consecutive region address fields is not established in system memory until the time at which said first region is established.

27. The method of claim 26, wherein during the operation of said system for compiling, linking and loading of said procedures, a count is established of the number of sets of initialization data that are required by said procedures and wherein establishing said array of region addresses in system memory includes the steps of:
  accessing said previously established array address field of system memory;
  determining that said array address field stores said predetermined value;
  allocating memory space at an available address of system memory, said memory space being sufficient for storing said array of region address fields with a number of region address fields equal to said count of said number of said sets of initialization data; and
  storing in said array address field said available memory address allocated for said array of region address fields.

28. The method of claim 27, further comprising the step of storing each said region address field as a predetermined value when said step of allocating said memory space for said array of region addresses has been completed.

29. The method of claim 28, wherein establishing each said region other than said first region and accessing that region after it is established comprise the steps of:
  accessing system memory said previously established array address field to determine the memory address of said array of consecutive region address fields;
  accessing said array with said memory address of said array;
  accessing with said region index of said region descriptor the region address field of said array that will provide access to the region being established or accessed;
  determining whether said accessed region address field stores said predetermined value;
  in the event said accessed region address field stores a value other than said predetermined value, accessing in system memory at an address corresponding to said stored value said region for processing of said initialization data by said procedure;
  in the event said accessed region address field stores said predetermined value, establishing said region by the steps of
  accessing system memory with said memory address of said region descriptor to locate the template that includes initialization data for said region being created;
  determining an available system memory address for storing a duplicate copy of said initialization data;
  copying said initialization data at said available memory address to establish said region; and
  storing said available memory address in said region address field associated with said region being established so that subsequent access can be made to said region without accessing said template and copying said initialization data.

30. The method of claim 27, wherein said step of establishing said region descriptor includes the step of assigning as said region index a non-negative integer; said integer being assigned so that each region index is a different integer and said count of the number of sets of initialization data corresponds to the highest valued integer of said region indices.

31. The method of claim 30, wherein establishing each said region other than said first region includes the steps of:

determining whether the region index for said region exceeds said count of the number of sets of initialization; and, if so, expanding said array of said consecutive region address fields to include a field for said region.

32. The method claim 31, further comprising the step of storing a predetermined value in said region address field when said step of allocating said memory space for said array of region addresses has been completed.

33. The method of claim 32, wherein establishing each said region other than said first region and access to that region after it is established comprises the steps of:

accessing said array address field of system memory to determine the memory address of said array of consecutive region address fields;

accessing in system memory said array with said address of said array;

accessing with said region index of said region descriptor memory addresses the region address field that will identify the region being established or accessed;

determining whether said accessed region address field stores said predetermined value;

in the event said accessed region address field stores a value other than said predetermined value, accessing with said value other than said predetermined value said region for processing of said initialization data by said procedure;

in the event said accessed region address field stores said predetermined value, establishing said region by the steps of accessing in system memory with said memory address of said region descriptor the template that includes initialization data for said region to be;

determining an available system memory address for storing a duplicate copy of said initialization data;

copying said initialization data at said available memory address to establish said region; and storing said available memory address in said region address field associated with said region being established so that subsequent access can be made to said region with said available memory address without accessing said template and copying said initialization data.

34. The method of claim 23, wherein during the operation of said system for compiling, linking and loading of said procedures, a count is established of the number of sets of initialization data required by said procedures and said array of said region address fields is established with a number of address fields that is equal to said count.

35. The method of claim 34, wherein:

a first set of one or more of said procedures is loaded into system memory and, during execution of said first set of procedures a second set of procedures is loaded into system memory for execution with said first set of procedures; and wherein said operation of loading said second set of procedures includes the step of adding said count of the number of sets of initialization data required by said first set of procedures to the count of the number of sets of initialization data required by said second set of procedures to produce a count of (n+m) sets of initialization data, where n is the count for said first set of procedures and m is the count for said second set of procedures.

36. The method of claim 35, further comprising the step of establishing in system memory an addressable array address field for storing the address of said array of consecutive region address fields.

37. The method of claim 36, wherein said step of establishing each said region includes the steps of:

accessing said array address field in system memory to determine the memory address of said array of region address fields;

accessing said array with said memory address of said array of region address fields, and determining within said array the region address field for said region.

38. The method of claim 37, wherein, during the operation of said system for compiling, linking and loading of said procedures, said array address field is loaded to store a predetermined value and wherein said array of consecutive region address fields is not stored in system memory until the time at which said first region is established in system memory.

39. The method of claim 38, wherein establishing said array of region addresses in system memory includes the steps of:

accessing said array address field;

detecting that said array address field stores said predetermined value;

allocating memory space at an available address of system memory, said memory space being sufficient for establishing said array of region address fields with a number of region address fields that is equal to (n+m); and storing in said array address field said available memory address allocated for said array region address fields.

40. The method of claim 39, further comprising the step of storing a predetermined value in each said region address field when said step of allocating said memory space for said array of region addresses has been completed.

41. The method of claim 40, wherein establishing each said region other than said first region and accessing that region after it is created comprises the steps of:

accessing said array address field of system memory to determine the memory address of said array of consecutive region address fields;

accessing in system memory said array with said address of said array;

accessing with said region index of said region descriptor memory address the region address field that will identify the region being established or accessed;

determining whether said accessed region address field stores said predetermined value;

in the event said accessed region address field stores a value other than said predetermined value, accessing with said value other than said predetermined value said region for processing of said initialization data by said procedure;

in the event said accessed region address field stores said predetermined value, establishing said region by the steps of accessing in system memory with said memory address of said region descriptor the template that includes initialization data for said region to be;

determining an available system memory address for storing a duplicate copy of said initialization data;

copying said initialization data at said available memory address to establish said region; and storing said available memory address in said region address field associated with said region being established so that subsequent access can be made to said region with said available memory address without accessing said template and copying said initialization data.

42. The method of claim 35, wherein, during said operation of said system for compiling, linking and leading said procedures, said method further includes the steps of:

determining whether more than one set of initialization data is associated with any particular region to be created; and, if so determining whether the sets of initialization data overlay one another;

in the event said sets of initialization data overlay one another, utilizing as said initialization data of said template for said particular region the set of initialization data required by the last procedure that is compiled and, in addition requires such initialization data; and in the event said sets of initialization data do not overlay one another, utilizing as said initialization data of said template for said particular region a concatenation of said sets of initialization data.

* * * * *